US006830095B2

(12) United States Patent
Sidener et al.

(10) Patent No.: US 6,830,095 B2
(45) Date of Patent: Dec. 14, 2004

(54) CASTING MOLD PLUG

(75) Inventors: Gregory L. Sidener, Noblesville, IN (US); Douglas A. Webster, Noblesville, IN (US)

(73) Assignee: Sidener Engineering Company, Inc., Noblesville, IN (US)

( * ) Notice: Subject to any disclaimer, the term of this patent is extended or adjusted under 35 U.S.C. 154(b) by 0 days.

(21) Appl. No.: 10/429,526

(22) Filed: May 5, 2003

(65) Prior Publication Data

US 2004/0221980 A1 Nov. 11, 2004

(51) Int. Cl.[7] ............................................. B22D 17/26
(52) U.S. Cl. .................... 164/343; 249/79; 249/141; 220/235; 220/236
(58) Field of Search .................... 164/113, 343; 249/79, 141; 220/235, 236

(56) References Cited

U.S. PATENT DOCUMENTS

| | | | |
|---|---|---|---|
| 3,612,150 A | 10/1971 | Rossi | |
| 3,814,136 A | 6/1974 | Johnson et al. | |
| 4,062,399 A | 12/1977 | Lirones | |
| 4,138,043 A | 2/1979 | Frech | |
| 4,798,237 A | 1/1989 | Nakano | |
| 4,874,275 A | * 10/1989 | Gotman | 411/5 |
| 4,946,363 A | 8/1990 | Cavender | |
| 5,400,461 A | * 3/1995 | Malish et al. | 15/230.17 |
| 5,740,935 A | * 4/1998 | Desfarges | 217/110 |
| 6,076,797 A | * 6/2000 | Schnautz | 249/79 |
| 6,110,402 A | 8/2000 | Miller | |
| 6,145,578 A | 11/2000 | Zearbaugh et al. | |
| 6,227,133 B1 | * 5/2001 | Gross | 114/198 |
| 6,354,361 B1 | 3/2002 | Sachs et al. | |
| 2002/0053633 A1 | 5/2002 | Wieder | |

* cited by examiner

Primary Examiner—Kiley S. Stoner
Assistant Examiner—I.-H. Lin
(74) Attorney, Agent, or Firm—Woodard, Emhardt, Moriarty, McNett & Henry LLP

(57) ABSTRACT

A plug for sealing and resealing the passages for heating and cooling liquid in a casting mold. The plug includes a stainless steel socket head NPT plug which is screwed into the passage to seal it. Inboard of the plug there is mounted a resilient expandable silicone tubular element that is expanded by squeezing it to further seal the passage.

22 Claims, 4 Drawing Sheets

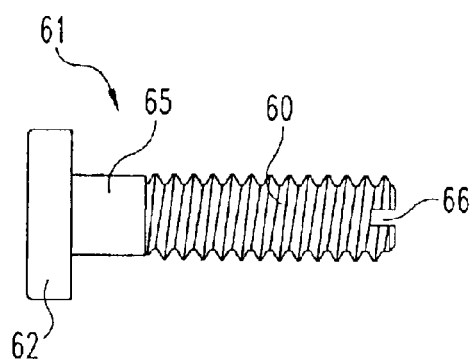
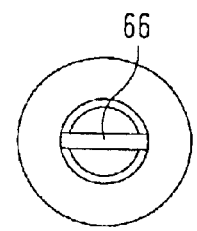
Fig. 13        Fig. 14
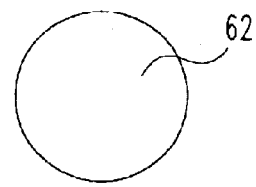
Fig. 15
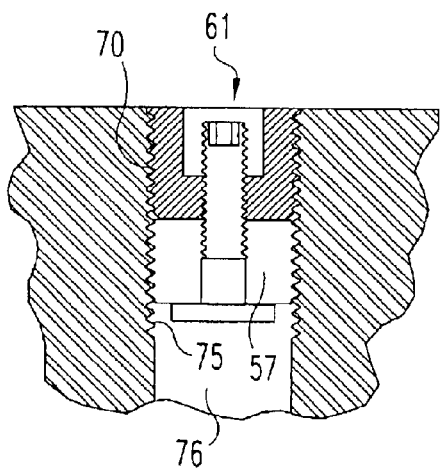
Fig. 16

CASTING MOLD PLUG

FIELD OF THE INVENTION

This invention relates to a plug and more particularly to a plug finding particular utility as a casting mold plug and to a method for sealing a casting mold.

BACKGROUND OF THE INVENTION

Relatively large dies are used to mold engine blocks, transmission housings, and other large die-cast parts out of aluminum. Such dies are made out of an exotic metal that is capable of retaining its solidity and shape at a temperature higher than the aluminum that is being cast in the die. The die has a series of passages that are used to conduct water or oil for heating and cooling the die. In the case of oil, the die is heated initially by the use of oil at a certain temperature being conducted through these passages and then later the same oil may be used to carry heat away from the die in an effort to maintain a consistent temperature of the die. In the case of water, the molten aluminum being injected into the die is relied upon to raise the die temperature to a working level. When the working temperature of the die is established, water flows through the die to carry away excess heat. During the manufacturing of the die, holes are drilled in the die to provide the necessary passages through which the oil or water will pass. Before the die can be used the holes must be plugged to retain the water or oil.

The passages in the die over a period of time become filled with debris so that it is desirable that the plugs that are used to seal the passages can be removed easily and conveniently and the passages cleaned out. Presently existing plugs for these passages have been found to fail over a period of time causing the water or oil to leak form the die. Because leaking from the die is not only wasteful and inefficient but can cause damage to the cast part, it is desirable that an improved means be provided for sealing the passages with plugs that do not leak after a period of use.

An alternative means of constructing the die would be to weld the plug in place but then the plug could not be removed in order to clean out the passages. The plugs must be easily removable. The plug openings are threaded NPT ports, that is, they are "National Pipe Thread" ports. The plugs are screwed into these ports and have a screw thread on them for mating with the threading in the ports. Over a period of time it is found that these plugs begin to leak and come out of the tapered thread openings. What is needed is plug that will seat, remain sealed, will not leak and will not come out over a period of time while the die is in use and yet is removable when it is desired to clean out the passages. The sealing plug must be suitable for use for both media and ambient temperatures of 350° F.

SUMMARY OF THE INVENTION

One embodiment of the plug of the invention might include an outwardly threaded first member having a bore therethrough. There is also provided a second member of resilient expandable material which has a cylindrical shape with a central opening. An outwardly threaded third member is received within the bore and extends through the central opening of the second member. Also there is provided an inwardly threaded disc threadedly received on the third member and having projections which extend therefrom into the second member. The second member is received between the first member and the disc whereby rotating the third member into the threads of the disc moves the disc toward the first member and squeezes and expands the second member.

Another embodiment of the invention involves a plug which includes a first piece which is externally threaded and has a tapped hole. There is also provided a second piece made out of resilient expandable material and having a tubular shape with a central opening. Finally a bolt having an enlarged head and a threaded shank extends through the central opening of the second piece and is threadedly received in the tapped hole. The bolt is rotatable relative to the first piece to move the head toward the first piece to compress and expand the second piece.

Still another embodiment of the invention involves a plug for a casting die which includes an outwardly threaded first member. There is also provided a resilient expandable second member mounted on said first member. Finally a threaded third member is mounted on said first member and connected to the second member for expanding the second member.

A further embodiment of the invention is a method for sealing the passage of a casting die which includes providing a first externally threaded member. A second resilient expandable member is mounted on the first member. The first and second members are inserted into the passage by threading the first member into threads in the passage and finally expanding the second member against the walls of the passage.

DESCRIPTION OF THE DRAWINGS

FIG. 13 is a side elevation of a further part of the FIG. 1, and 9–12 embodiments.

FIGS. 14 and 15 are opposite and elevations of the part of FIG. 13.

FIG. 16 is a view similar to FIG. 1 of an alternative form of casting mold showing the FIG. 1 plug.

DESCRIPTION OF THE PREFERRED EMBODIMENT

Figure 1:
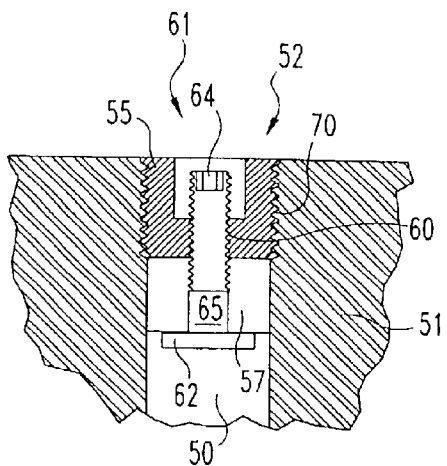
FIG. 1 is a fragmentary view of a casting mold showing the plug of the present invention in a passage of the casting mold.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
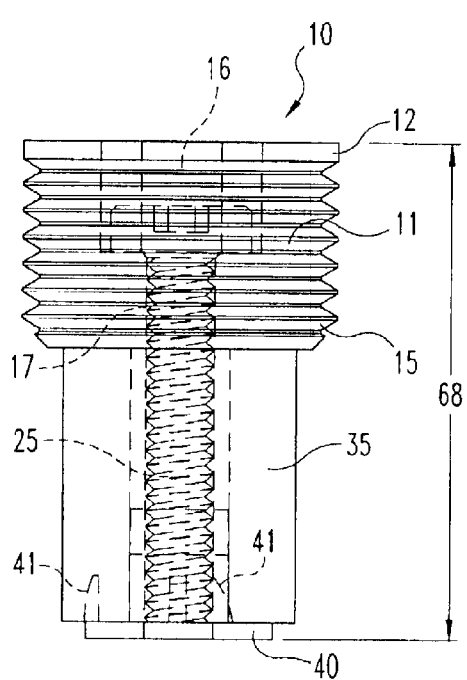
FIG. 2 is a side elevation of an alternative embodiment of the plug of this invention.
Figure 3:
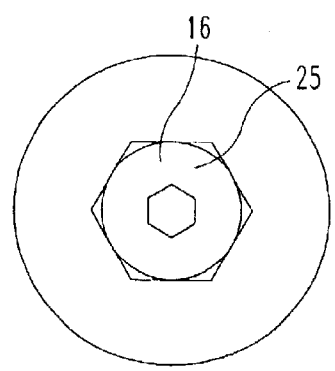
FIG. 3 is a top plan of the embodiment of FIG. 2.
Figure 4A:
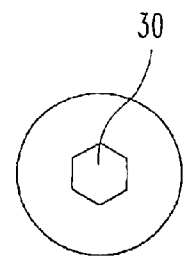
FIG. 4A is an end elevation of the screw.
Figure 4:
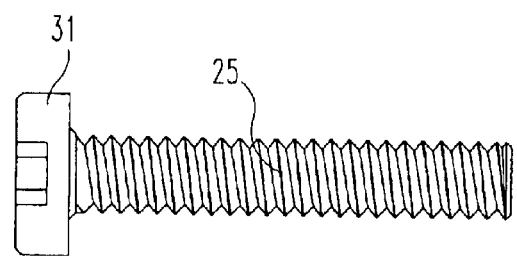
FIG. 4 is a side elevation of a screw forming a part of the embodiment of FIGS. 2–3.
Figure 5:
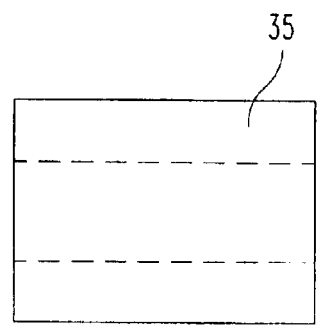
FIG. 5 is a side elevation of a part forming a portion of the embodiment of FIGS. 2–4.
Figure 6:
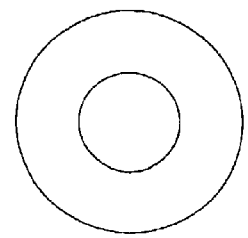
FIG. 6 is an end elevation of the part of FIG. 5.
Figure 7:
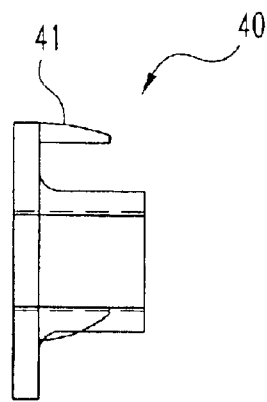
FIG. 7 is a side elevation of a disc forming a portion of the FIG. 2–6 embodiment.
Figure 8:
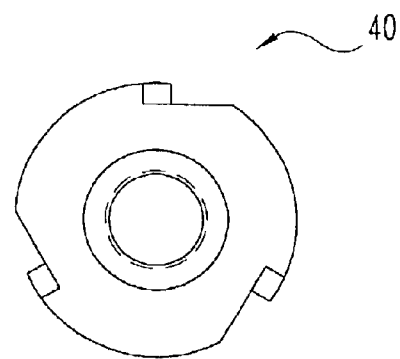
FIG. 8 is an end elevation of the FIG. 7 disc.

Referring to the enclosed drawings and particularly to FIG. 2, plug 10 includes an outwardly threaded member 11. The threads are tapered from a larger size at the end 12 of the member to a smaller size at the end 15 of the member. The member 11 has a recess 16 that has a hexagonal configuration so that the member 11 can be screwed into place by a wrench. The member 11 also has a bore 17 therethrough which receives a screw 25. The screw 25 is also shown in FIGS. 4 and 4A and has an internal hex opening 30 in its head 31. The screw 25 extends through a cylindrical silicone member 35 (detailed in FIGS. 5 and 6) and has threadedly mounted on its distal end a disc 40 (See FIGS. 7 and 8) having three projections 41 that extend upwardly and bite into the silicone 35. When the screw 25 is rotated to screw into the disc 40 it forces the disc against the silicone 35 and squeezes it forcing it to expand outwardly so as to seal the passage within which the plug is mounted.

Figure 9:
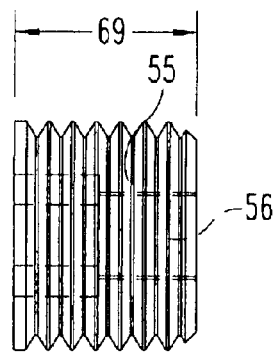
FIG. 9 is a side elevation of a part of the plug of FIG. 1.
Figure 10:
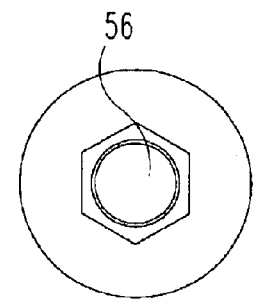
FIG. 10 is an end elevation of the FIG. 9 part.
Figure 11:
FIG. 11 is a side elevation of a further part of the FIG. 1 embodiment.
Figure 12:
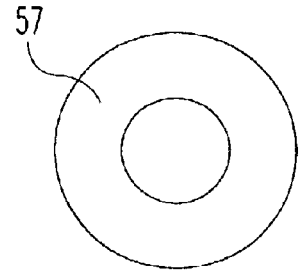
FIG. 12 is an end elevation of the FIG. 11 part.

Another embodiment of the plug of the invention is shown in FIG. 1 mounted in the passage 50 of a die 51. The plug 52 of FIG. 1 is constructed with three members or pieces. One piece 55 (FIG. 9) is a modified stainless steel, socket head, NPT plug that has a hole 56 drilled and tapped in the center of it. The external thread on the piece 55 is a standard "right-hand" thread. The tapped hole has a "left-hand" thread. A second piece 57 (FIGS. 1, 11 and 12) is a silicone material that has been custom molded into a tubular shape. This tubular shaped silicone piece 57 is placed over the threaded section 60 of a bolt 61 which is the third piece of the plug 52. The bolt 61 is shown in FIGS. 13, 14 and 15. Bolt 61 has a large diameter cylindrical head 62 and the shank 65 of the bolt is not threaded all the way to the head. The threaded shank has a socket head 64 or screwdriver slot 65 on the threaded end of the shank. Note FIG. 1 shows a socket head while FIGS. 13 and 14 show a slot). When assembled as shown in FIG. 1 the tubular silicone 57 is placed down over the threaded shank 65 of the bolt and the bolt is threaded into the stainless steel piece 55.

In order to plug the passage 50 of the die 51, the plug 52 is inserted into the passage with the silicone piece 51 being inserted first and then the piece 55 being screwed into the port of the die. When inserted into the die 51, a large hex-head wrench is used to tighten the stainless steel piece 55 in the NPT port of the die. After the piece 55 is tightened, a smaller hex-head wrench or a screwdriver is used to turn the tapped shank of the bolt in the piece 55. As the shank is turned the bolt head 62 moves closer to the piece 55 causing the silicone to compress on the shank and expand it's outside diameter against the walls of the passage 50 of the die, sealing the passage.

While the invention has been illustrated and described in detail in the drawings and foregoing description, the same is to he considered as illustrative and not restrictive in character, it being understood that only the preferred embodiments have been shown and described and that all changes and modifications that come within the spirit of the invention are desired to be protected. For example, the plug can be made out of various materials and the elements, pieces and members making up the plug can have various shapes and sizes. Referring to the embodiment of FIG. 2, the dimension 68 might be 1.355 inches with all other dimensions in FIGS. 2–8 being scaled accordingly. As a further example the dimension 69 in FIG. 9 might be 0.43 inches with all other dimensions being scaled accordingly.

As another example within the scope of the invention the silicone member 35 (and the member 57) which might have to be molded members if made out of silicone could be replaced by a less expensive extruded member made out of, for example, a viton material. Both such materials and other such materials for this member should have the property of expanding to seal the passage when they are squeezed. Thus such materials have the property of maintaining or attempting to maintain the same volume when they are deformed. Other alternative forms of the invention within the scope of the invention can be conceived. For example the threading 60 on bolt 61 is preferably left-handed for the reason that the installer of the plug 52 can tighten the threads 60 by turning the bolt 61 in the same rotary direction as the piece 55 is turned to tighten the threads 70. However, it is included within the invention to make the threads 60 right-handed as well. Various other alternative embodiments of the invention will be evident from a reading of the specification and a review of the drawings and are intended to be included by the following claims.

As still another example it is not always known what the depth of the threads are in the passage or hole in the die that is being plugged. FIG. 16 shows that the plug of the invention can be used to plug the passage even though the threads 75 in the mold passage 76 extend a greater distance than the threads 70. In this application of the invention the piece 55 may be screwed into the passage 76 only to the point where it is generally flush with the die and then the bolt 61 is tightened to expand the piece 57.

What is claimed:

1. A plug comprising
   (a) an outwardly threaded first member having a bore therethrough;
   (b) a second member of resilient and expandable material having a cylindrical shape with a central opening;
   (c) an outwardly threaded third member received within said bore and extending through the central opening of said second member; and
   (d) an inwardly threaded disc threadedly received on said third member, said disc having projections extending therefrom into said second member, said second member being received between said first member and said disc whereby rotating said third member into the threads of said disc moves said disc toward said first member and squeezes and expands said second member.

2. The plug of claim 1 wherein said first member has an outer end and an inner end and has threads which taper from a larger size at said outer end to a smaller size at said inner end.

3. The plug of claim 2 wherein said second member is positioned adjacent said inner end and between said inner end and said disc.

4. The plug of claim 3 wherein said second member is silicone.

5. A plug comprising
   (a) a first piece which is externally threaded and has a tapped hole;
   (b) a second piece made out of resilient expandable material and having a tubular shape with a central opening; and
   (c) a bolt having an enlarged head and a threaded shank extending through the central opening of said second piece and threadedly received in said tapped hole, said bolt being rotatable relative to said first piece to move said head toward said first piece to compress and expand said second piece.

6. The plug of claim 5 wherein the external threading of the first piece is right-handed and the tapped hole has a left-hand thread.

7. The plug of claim 6 wherein said first piece has a hexagonal recess adapted to fit a hexagonal wrench and said bolt has a hexagonal recess adapted to fit a hexagonal wrench.

8. The plug of claim 5 wherein said first piece has an outer end and an inner end and has threads which taper from a larger size at said outer end to a smaller size at said inner end.

9. The plug of claim 8 wherein said second piece is positioned adjacent said inner end and between said inner end and said enlarged head.

10. A plug for a casting die comprising
    (a) an outwardly threaded first member;
    (b) a resilient expandable second member mounted on said first member; and
    (c) a threaded third member mounted on said first member and connected to said second member for expanding said second member.

11. The plug of claim 10 wherein the outwardly threaded first member has an outer end and an inner end, said first member being formed with a socket recess at said outer end to fit a socket wrench, said third member having an end extending into said socket recess and being formed to fit a tool for rotation of said third member.

12. The plug of claim 11 wherein said first member has an outer end and an inner end and has threads which taper from a larger size at said outer end to a smaller size at said inner end.

13. The plug of claim 12 wherein said second member is silicone.

14. The plug of claim 12 wherein the second member has the property of maintaining or attempting to maintain the same volume when deformed.

15. A method for sealing the passage of a casting die comprising
    (a) providing a first externally threaded member;
    (b) mounting a second resilient expandable member on said first member;
    (c) inserting said first and second members into the passage by threading the first member into threads in the passage; and
    (d) and expanding the second member against the walls of the passage.

16. The method of claim 15 wherein the inserting is accomplished by first inserting the second member and then screwing in the first member.

17. The method of claim 16 wherein the expanding of the second member is accomplished by squeezing it against the first member.

18. A plug and casting die combination comprising:
    (a) a casting die having a passage;
    (b) an outwardly threaded first member threadedly received in the passage;
    (c) a resilient expandable second member mounted on said first member; and
    (d) a threaded third member mounted on said first member and connected to said second member and expanding said second member in said passage against said casting die.

19. The combination of claim 18 wherein the outwardly threaded first member has an outer end and an inner end, said first member being formed with a socket recess at said outer end to fit a socket wrench, said third member having an end extending into said socket recess and being formed to fit a tool for rotation of said third member.

20. The combination of claim 19 wherein said first member has an outer end and an inner end and has threads which taper from a larger size at said outer end to a smaller size at said inner end.

21. The combination of claim 20 wherein said second member is silicone.

22. The combination of claim 20 wherein the second member has the property of maintaining or attempting to maintain the same volume when deformed.

* * * * *